(12) United States Patent
Syrovy

(10) Patent No.: US 12,454,942 B1
(45) Date of Patent: Oct. 28, 2025

(54) FLOATING WIND TURBINE WITH PASSIVE PITCH CORRECTION

(71) Applicant: George J. Syrovy, Centerville, MA (US)

(72) Inventor: George J. Syrovy, Centerville, MA (US)

(73) Assignee: George J. Syrovy, Centerville, MA (US)

( * ) Notice: Subject to any disclaimer, the term of this patent is extended or adjusted under 35 U.S.C. 154(b) by 0 days.

(21) Appl. No.: 19/259,810

(22) Filed: Jul. 3, 2025

Related U.S. Application Data

(63) Continuation of application No. PCT/US2025/017793, filed on Feb. 28, 2025.
(Continued)

(51) Int. Cl.
*F03B 13/20* (2006.01)
*F03D 1/00* (2006.01)
(Continued)

(52) U.S. Cl.
CPC ............ *F03D 13/256* (2023.08); *F03B 13/20* (2013.01); *F03D 1/141* (2023.08); *F03D 7/0202* (2023.08); *F03D 7/0204* (2013.01); *F03D 7/04* (2013.01); *F03D 9/008* (2013.01); *F05B 2240/93* (2013.01); *F05B 2240/95* (2013.01)

(58) Field of Classification Search
CPC ...... F03D 13/256; F03D 13/20; F03D 7/0202; F03D 7/0204; F03D 7/04; F03D 1/141; F03D 1/181; F03D 9/008; F05B 2240/14; F05B 2240/142; F05B 2240/93; F05B 2240/95; H02K 7/04
See application file for complete search history.

(56) References Cited

U.S. PATENT DOCUMENTS 4,142,830 A * 3/1979 Schonball ............. F03D 7/0216
416/41
4,183,717 A * 1/1980 Yamada ................... F03D 9/25
416/142
(Continued)

FOREIGN PATENT DOCUMENTS

KR 20150004160 A 1/2015
WO 2020264103 A1 12/2020
(Continued)

OTHER PUBLICATIONS

Akimoto, Hiromichi. Preliminary study of the Floating Axis Wind Turbine. Conference Paper. Sep. 3, 2015. 4 pages. IEEE. Yeosu, Korea.

*Primary Examiner* — Tulsidas C Patel
*Assistant Examiner* — Thomas K Quigley
(74) *Attorney, Agent, or Firm* — Sandberg Phoenix & von Gontard, P.C.

(57) ABSTRACT

The nacelle (27) of a horizontal axis wind turbine (WT) is mounted on a vertical support (VS) by means of a pivot (33). The vertical support is mounted off-center with respect to a floating, rotatable support (7). A weight (43) functionally attached to the nacelle maintains the axis of the turbine horizontal as the floating support pitches (rotates forward and back). The weight is attached to an elongate vertical element (41). Relative motion between the vertical element (41) and the pitching floating support (HS) generates an electric current.

19 Claims, 5 Drawing Sheets

Related U.S. Application Data

(60) Provisional application No. 63/558,852, filed on Feb. 28, 2024.

(51) Int. Cl.
*F03D 7/02* (2006.01)
*F03D 7/04* (2006.01)
*F03D 9/00* (2016.01)
*F03D 13/25* (2016.01)

(56) References Cited

U.S. PATENT DOCUMENTS

| | | |
|---|---|---|
| 4,362,466 A | 12/1982 | Schonball |
| 4,447,740 A | 5/1984 | Heck |
| 4,590,718 A * | 5/1986 | Angeloff ................ F03D 80/50 |
| | | 52/745.18 |
| 4,630,996 A | 12/1986 | Masaki |
| 6,132,172 A * | 10/2000 | Li ........................ F03D 7/0216 |
| | | 416/201 A |
| 6,974,307 B2 * | 12/2005 | Antoune ............... F03D 7/0212 |
| | | 416/150 |
| 8,692,401 B2 * | 4/2014 | Roddier .................. F03D 9/257 |
| | | 290/44 |
| 9,751,602 B2 | 9/2017 | Nakamura et al. |
| 10,024,307 B2 | 7/2018 | Selsam |
| 10,060,413 B2 * | 8/2018 | Pitre ....................... F03D 7/041 |
| 11,384,736 B1 | 7/2022 | Piasecki et al. |
| 11,560,876 B2 | 1/2023 | Syrovy |
| 11,891,977 B2 * | 2/2024 | Ramde .................... B63B 43/02 |
| 2007/0138021 A1 * | 6/2007 | Nicholson ................ F03D 9/32 |
| | | 205/628 |
| 2012/0103244 A1 * | 5/2012 | Gong ..................... B63B 35/44 |
| | | 114/265 |
| 2017/0067449 A1 | 3/2017 | Whitehouse et al. |
| 2017/0241408 A1 | 8/2017 | Von Heland |
| 2020/0362825 A1 * | 11/2020 | Barber .................... F03D 13/20 |

FOREIGN PATENT DOCUMENTS

| | | |
|---|---|---|
| WO | 2021002759 A1 | 7/2021 |
| WO | 2022228885 A1 | 11/2022 |

* cited by examiner

FLOATING WIND TURBINE WITH PASSIVE PITCH CORRECTION

CROSS REFERENCE TO RELATED APPLICATIONS

This application is a continuation of PCT Application No. PCT/US2025/017793, filed Feb. 28, 2025, which claims the benefit of provisional application Ser. No. 63/558,852, filed Feb. 28, 2024. The disclosure of those applications, including their Appendices, is hereby incorporated by reference.

STATEMENT REGARDING FEDERALLY SPONSORED RESEARCH OR DEVELOPMENT

Not applicable.

BACKGROUND OF THE INVENTION

This invention relates to floating wind-driven turbines, and in particular to floating horizontal-axis wind turbines (HAWTs).

Traditional wind turbines are horizontal-axis machines having generally vertical blades supported by a hub carried by a horizontal shaft. The horizontal shaft is connected to a gearbox or other drive train, a brake assembly, and a generator. The horizontal shaft, drive train, brake assembly, and generator are covered by a nacelle, which is in turn rotatably mounted on a vertical mast or tower. The blades are generally mounted upwind of the mast to avoid turbulence caused by the mast. The nacelle and the assembly of parts contained by the nacelle are frequently referred to as the "nacelle," and that terminology is used herein, unless otherwise clearly indicated. The nacelle's rotational position ("yaw") is controlled by positioning motors directly below the nacelle. The yaw motors keep the axis of rotation of the blades constantly aligned with the wind when the turbine is in operation (zero degree angle of attack).

Commercial wind turbines (HAWTs) typically have a cut-in wind speed (at which the turbine starts to turn and produce power) of about seven to nine miles per hour (3-4 m/sec), a rated wind speed (at which the turbine first generates its rated power) of about thirty-three miles per hour (15 m/sec), and a cut-out speed (at which the turbine is prevented from turning to prevent damage to the turbine) of about fifty-six miles per hour (25 m/sec). Commercial wind turbines are designed to produce a constant electrical output at wind speeds between rated wind speed and cut-out wind speed. To maintain a constant rotational speed, the efficiency of the blades is decreased as wind speed increases above the rated speed. This is typically accomplished with "blade-pitch" motors in the hub, which turn the blades to alter their angle of attack. The blade-pitch motors are controlled by a computer which receives signals from sensors measuring such things as wind speed, blade position, and rotational speed (power production). When wind speed exceeds the cut-out value, the blade-pitch motors furl the blades by turning them with their leading edge facing the wind, and brake the rotor (horizontal shaft). The blade pitch-control mechanism produces an area of weakness in the blade-hub structure and adds complication to the design.

In 2019, industrial wind turbines typically had blades ranging from 100 to 150 feet (30-46 meters) in length, mounted on a tower (mast) that is about 200-270 feet (61-82 meters) tall. Those numbers have now increased and are projected to increase further. The steel tower is anchored in a platform of more than a thousand tons of concrete and steel rebar, thirty to fifty feet (9-15 meters) across and six to thirty feet (2-9 meters) deep. The platform is critical to stabilizing the immense weight of the turbine assembly. A typical industrial wind turbine weighs between one hundred fifty and three hundred fifty tons (136-318 metric tons); the nacelle weighs fifty to seventy five tons (45-78 metric tons), the blade assembly weighs thirty-five to forty-five tons (14-41 metric tons), and the tower (mast) weighs seventy to two hundred twenty tons (64-200 metric tons) (www.wind-watch.org/faq-size-p.php).

Wind turbines also require a great deal of clear space-ten rotor diameters in the direction of the wind, and three rotor diameters in every other direction. In a location in which the wind can come from more than one direction; this requires a spacing of ten rotor diameters in every direction, or a total clear space of over eighty acres (32 hectares) per tower.

Placing wind turbines off-shore has long been seen as desirable, to obtain the unobstructed space required, and to take advantage of the relatively high average wind speed in these locations. Wind speed is particularly important, because the kinetic energy of wind is proportional to the cube of its speed. If the average speed of wind off-shore is double the speed onshore, the energy available to be harvested is eight times as great. Off-shore wind turbines may be even larger than land-based industrial turbines, because they, or their components, can be transported on ships rather than by road (www.energy.gov/eere/wind/how-do-wind-turbines-work).

Building off-shore wind turbines in the United States is more difficult than in many European locations, where many suitable off-shore locations are in shallow water. Most of the U.S. suitable locations are located in deep water, having a depth of sixty meters or more. Traditional bottom-mounted supports, as are used in shallow water, are not economical at such depths.

Floating platforms, tethered to the sea floor, have been proposed, built, and successfully tested. Such platforms are generally based on oil and gas platform technologies. The dynamic nature of the wind turbine and its top-heaviness place additional requirements on a floating platform. Three principal schemes have been proposed-a spar buoy which relies on a large submerged mass to maintain stability; a semisubmersible design, in which several spaced-apart cylinders are filled with ballast, such as water; and a tension-leg platform in which anchors are connected by tension lines to spaced-apart tie points on the platform. As applied to a horizontal-axis wind turbine, all of these approaches, particularly the first two, require a very large weight as compared with the swept area of the turbine. The ratio of swept area to overall weight is increasingly recognized as an important consideration in floating wind turbine design.

Although the approaches previously suggested may be sufficient to keep the structure afloat, they do not provide the kind of stability needed for efficient operation of the turbine. A horizontal-axis turbine generally requires that wind striking the blades be parallel to the axis of rotation within a very few degrees. Any rotational movement of the turbine's mast toward or away from the wind ("pitch") greatly reduces the efficiency of the turbine. Otherwise stated, any pitch in the floating platform will cause a corresponding change in the angle of attack. An angle of attack varying from zero by even two or three degrees greatly reduces the efficiency.

The axis of the turbine must also rotate around the vertical axis of its mast ("yaw"). The stability problem of all conventional horizontal axis wind turbines, both on land and particularly off-shore, is exacerbated by the need for yaw positioning motors, frequently eight or more motors, at the top of the mast. These yaw motors make the turbine even more top-heavy.

Syrovy, U.S. Pat. No. 11,560,876, hereby incorporated by reference, solves many of the problems of prior floating wind turbines. In that patent, the present inventor noted that of all the motions possible for a floating horizontal axis wind turbine-heave, sway, surge, roll, pitch, and yaw-only the yaw and pitch components have a substantial effect on the efficiency of the turbine. The construction disclosed in that patent provides passive control of the yaw component, by mounting the support for the horizontal-axis turbine on a rotatable ring with the center of gravity of the turbine behind the axis of rotation of the ring. This arrangement provides automatic control of yaw, so that the axis of rotation of the turbine is always aligned with the wind, with the blades of the turbine facing the wind. However, that design requires an active control to maintain a horizontal pitch of the turbine's axis of rotation. Furthermore, the active control inevitably requires a finite time delay.

Further background of the invention is found in the above-mentioned U.S. Pat. No. 11,560,876, Syrovy, U.S. Pat. No. 10,024,307, Selsam, and U.S. Published Application 2017/0241408, von Heland, the contents of all of which are hereby incorporated by reference.

BRIEF SUMMARY OF THE INVENTION

In accordance with the present invention, the rotational axis of a floating horizontal axis wind turbine is maintained horizontal as the flotation system pitches, without requiring active pitch control. The system may be combined with the yaw control system of my prior U.S. Pat. No. 11,560,876 so that the wind turbine requires no active pitch or yaw control. The system of the present invention is substantially independent of the type of flotation system employed. The pitch compensation system of the present invention may operate substantially instantaneously. The simplified construction makes it possible to mount multiple wind turbines on a single floating support.

Certain aspects of the invention are set forth in the appended claims. Others will be apparent to those skilled in the art in light of the following descriptions of preferred embodiments.

DETAILED DESCRIPTION OF INVENTION

Figure 1:
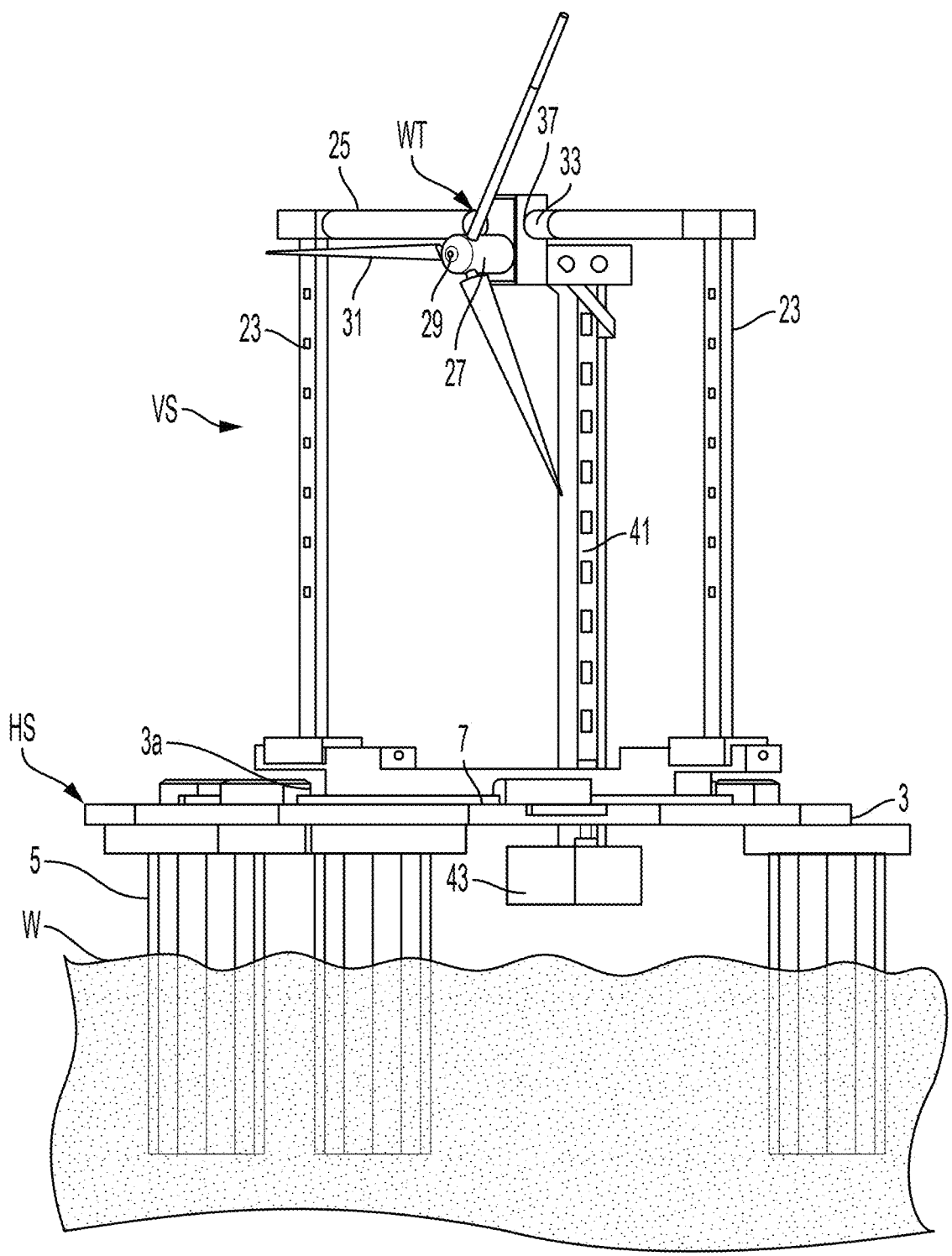
FIG. 1 is a view in right front elevation of an illustrative embodiment of floating horizontal axis wind turbine in accordance with the present invention, floating in a body of water.
Figure 2:
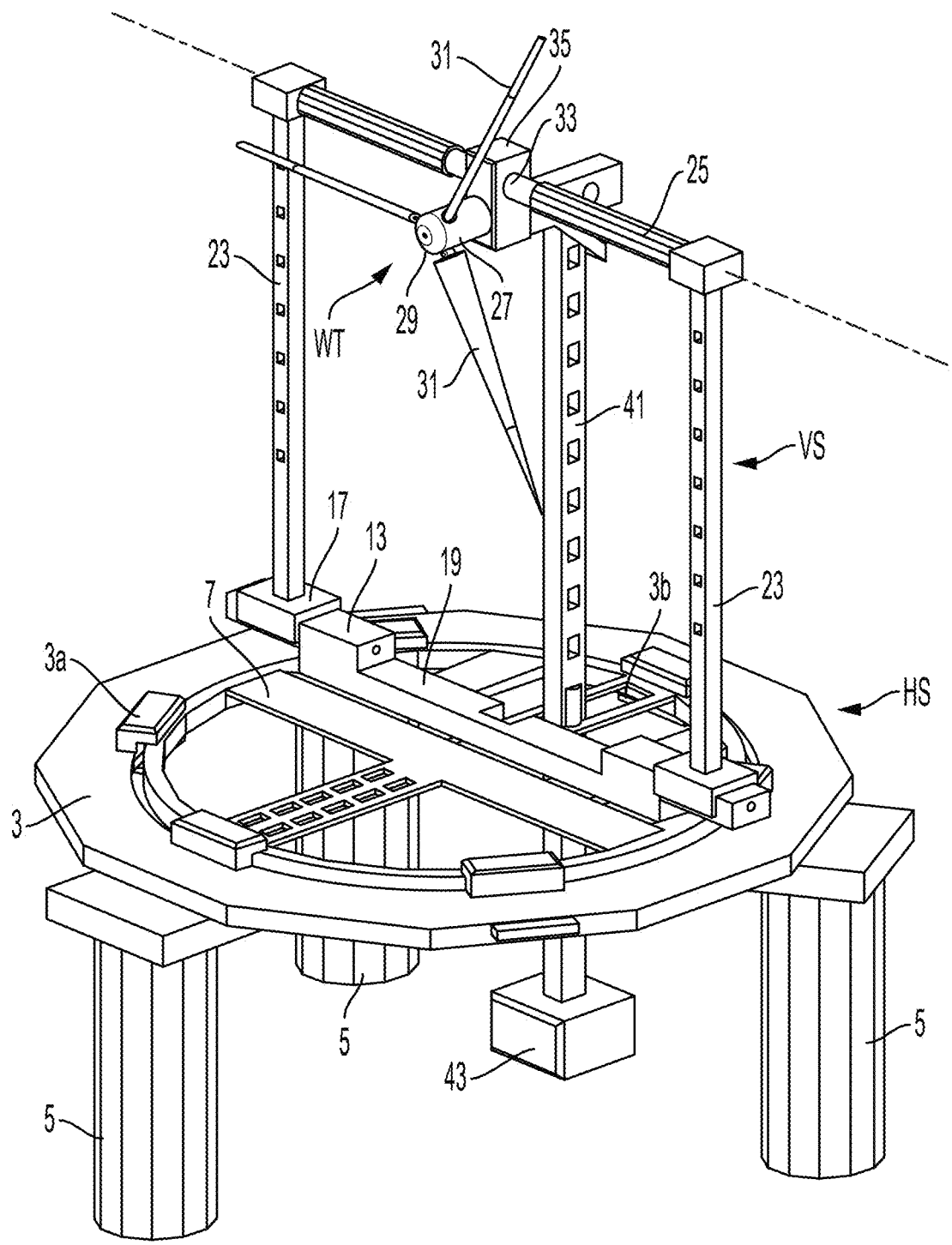
FIG. 2 is a view in right front perspective of the wind turbine of FIG. 1.
Figure 5:
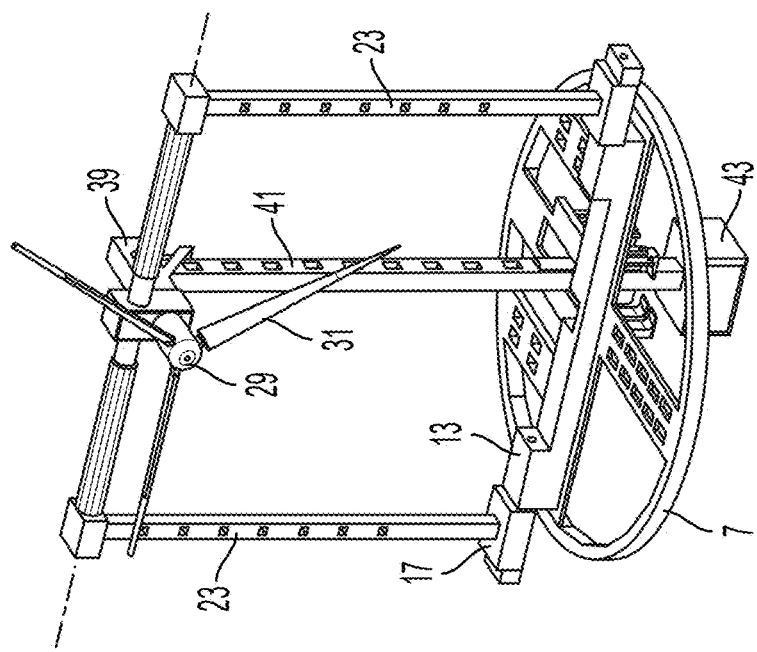
FIG. 5 is a view in right front perspective of a wind turbine assembly of the invention, composed of the assembled subassemblies of FIGS. 3 and 4.
Figure 4:
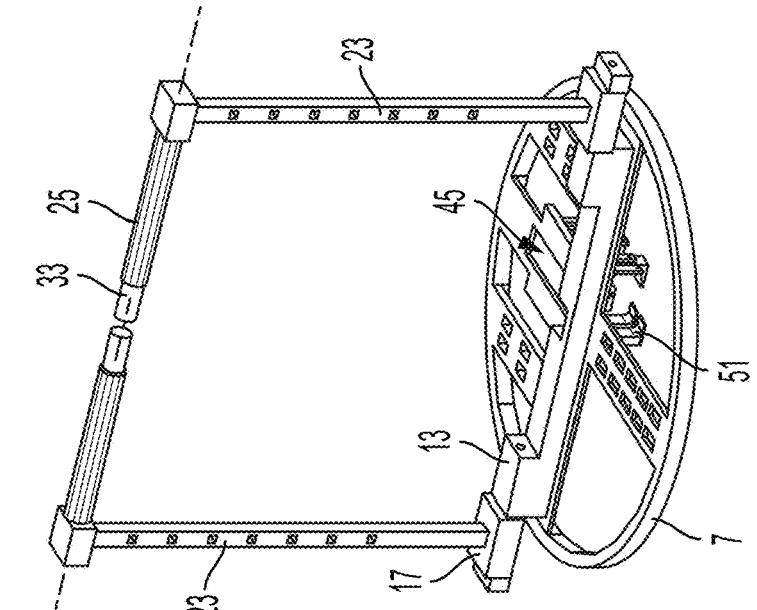
FIG. 4 is a view in right front perspective of a support subassembly of the turbine of FIGS. 1 and 2
Figure 3:
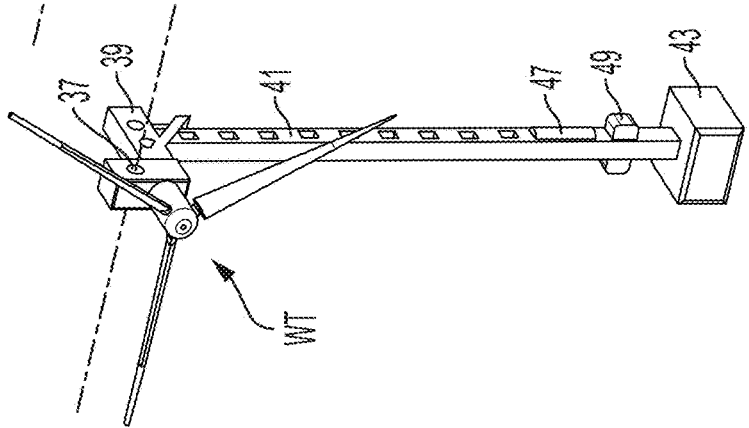
FIG. 3 is a view in right front perspective of a fixed-pitch subassembly of the turbine of FIGS. 1 and 2.
Figure 7:
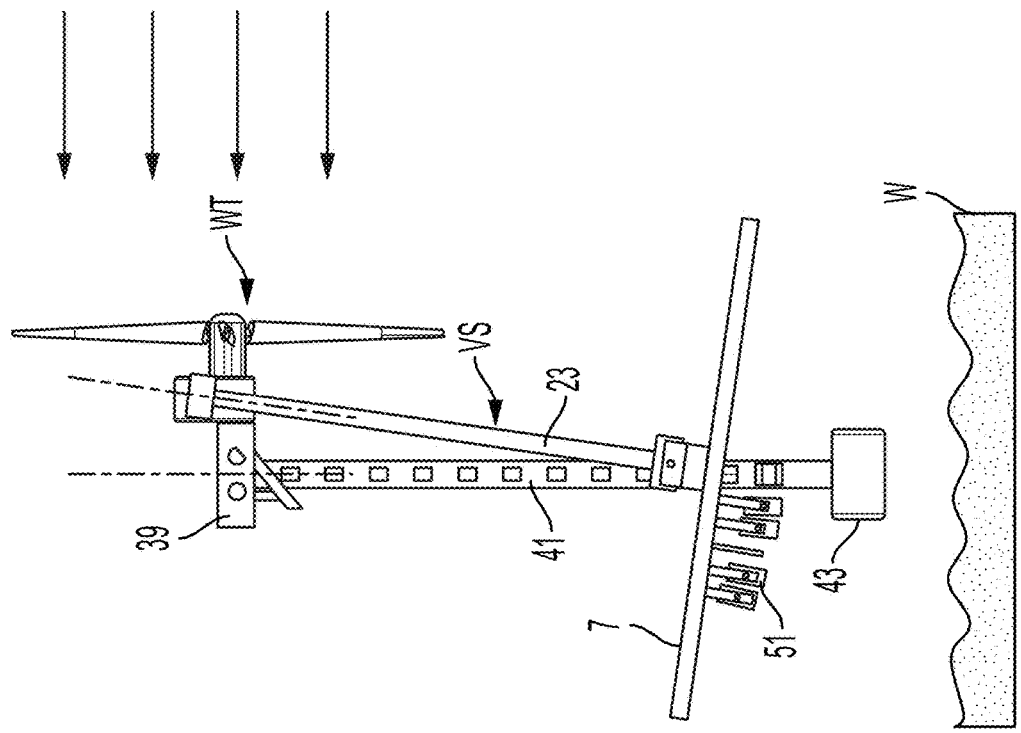
FIG. 7 is a view in left side elevation of the assembly of FIG. 5, with the support subassembly pitched forward.
Figure 6:
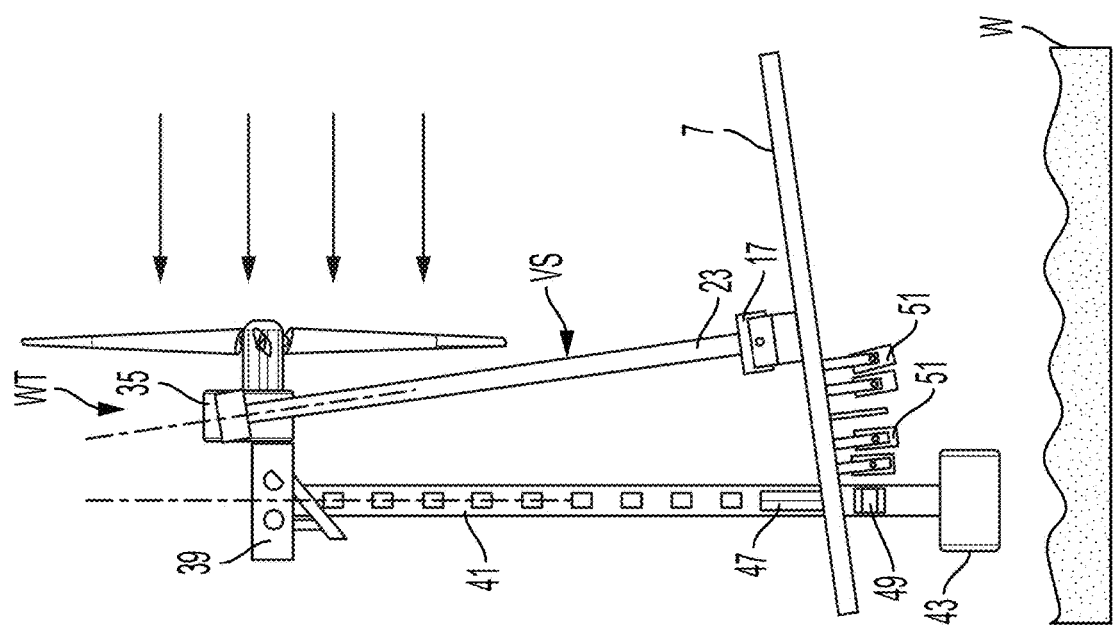
FIG. 6 is a view in left side elevation of the assembly of FIG. 5, with the support subassembly pitched rearward.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring now to the drawings, a stabilized horizontal-axis wind turbine 1 in accordance with an embodiment of the present invention shares many of the features of embodiments of my prior U.S. Pat. No. 11,560,876. It uses substantially the same structure to maintain yaw into the wind. Briefly, it includes a generally horizontal support structure HS, with a generally vertical support structure VS mounted to it, and a wind turbine WT mounted to the generally vertical support structure VS.

The generally horizontal support structure HS includes a stationary ring 3 mounted on floats 5 floating on an open body of water W. The stationary ring 3 forms a race having an upper arm 3a and a lower arm 3b for supporting a rotatable inner ring 7. The rotatable inner ring 7 has lower wheels riding on the lower arm 3b of the stationary ring 3 and supporting the rotatable inner ring 7. The rotatable inner ring 7 also has upper wheels which can engage the upper arm 3a of the stationary ring 3 should the structure mounted to the inner ring start to tip.

The inner ring 7 includes two bosses 13 which rigidly carry support blocks 17. The bosses 13 are connected to each other by a structural brace 19. The bosses 13 are positioned well behind a diameter of the inner ring 7, so that the support blocks 17 and brace 19 lie on a chord having a length smaller than the diameter of the inner ring 7.

The generally vertical support structure VS is mounted to the rotating inner ring through the support blocks 17. Upright columns 23 are mounted at their lower ends to the support blocks 17. The upper ends of the columns 23 rotatably support a horizontal-axis wind turbine WT from a cross-bar 25 as described hereinafter.

The wind turbine WT comprises a nacelle 27 including at least a horizontal drive shaft and a drive train. The nacelle also conventionally includes a generator. The wind turbine WT also includes a rotatable hub 29 carrying blades 31 rotatable around a horizontal axis.

The columns 23 are formed from steel I-beams of far less mass than a traditional tower and form generally vertical upright legs. It will be understood that the shape of the upright legs may be varied and may include, for example, inclined legs like those of the first embodiment of my prior U.S. Pat. No. 11,560,876. Rotatably hung from a central cylindrical portion 33 of the cross-bar 25 is a steel support box 35 surrounding and supporting the nacelle 27 of the horizontal-axis wind turbine WT. The support box 35 is open front and back and includes openings 37 in its sides. The openings 37 are shown as circular, but they need only have arcuate upper surfaces to support the nacelle 27 and to form a revolute joint with the cylindrical portion 33 of the cross-bar 25. Flanges are conventionally provided the pivot portion 33 on either side of the support box 35 to prevent lateral movement of the support box 35. It will be seen that this construction permits relative movement between the nacelle 27 and the inner ring 7 only in a plane perpendicular to the plane swept by the blades 31.

The support box 29 supports the nacelle 27 behind the center of gravity of the wind turbine WT. To balance the wind turbine WT and keep its axis of rotation horizontal, a rearwardly-extending horizontal extension beam 39 is secured to the support box 35. An elongate vertical element 41 in the form of a shaft or box column is secured to the extension beam 39 by a brace 43, and a weight 43 is mounted on a lower portion of the elongate vertical element. The distance from the pivot 33/37 to the vertical element 41, the length of the vertical element 41, the position of the weight 43, and the size of the weight 43 are chosen to balance the wind turbine WT and maintain its axis of rotation horizontal. In this illustrative embodiment, the vertical element 41 extends below the rotating ring 7 through a rectangular slot 45, and the weight 43 is below the ring 7, but above the surface of the water 7. The side walls of the slot 45 restrain sideways movement of the vertical element 41 and thereby prevent the large bending moment that would otherwise be exerted on the pivot 33/37 when the assembly rolls. To permit smooth relative movement between the vertical element 41 and the slot 45, both sides of the vertical element 41 are provided with rollers 47 which ride on a side wall of the slot when the assembly rolls to one side.

In accordance with the illustrative embodiment, the relative movement between the always-vertical element 41 (at least always vertical with respect to forward and rearward pitch of the support structure), and the rotatable support structure (ring 7), which pitches with the waves, is utilized to generate an electrical output. This enables the apparatus to produce electricity from both wind and wave energy. As shown in FIGS. 3-7, coils 49 are provided on both sides of the vertical element 41. The coils 49 interact with permanent magnets 51 arranged in an arc below the ring 7 to generate an electric current. That current is preferably combined with the electric current produced by the wind turbine WT and sent by cable to land for consumption.

Numerous variations, within the scope of the appended claims, will occur to those skilled in the art.

Merely by way of example, multiple wind turbines may be suspended from the cross-bar 25. Numerous vertical supports may be provided, including without limitation the structures illustrated in my prior U.S. Pat. No. 11,560,876. The weight 43 may be made smaller by extending the horizontal extension beam 49. The shape of the weight 43 may be altered. Making it streamlined in at least one direction may be desirable.

Although the arrangement illustrated is presently preferred, the horizontal distance to the pivot could be made zero by hanging the weight directly from the support box 35 and modifying the ring structure to accommodate the vertical element 41.

The vertical element 41 and weight 43 may extend above the rotatable support, rather than through it. In that case, upwardly extending side walls on the rotatable support would be required to prevent sideways movement of the weight. The permanent magnets 51, if utilized, would also need to be mounted to the upper part of the rotating support.

Figure 8:
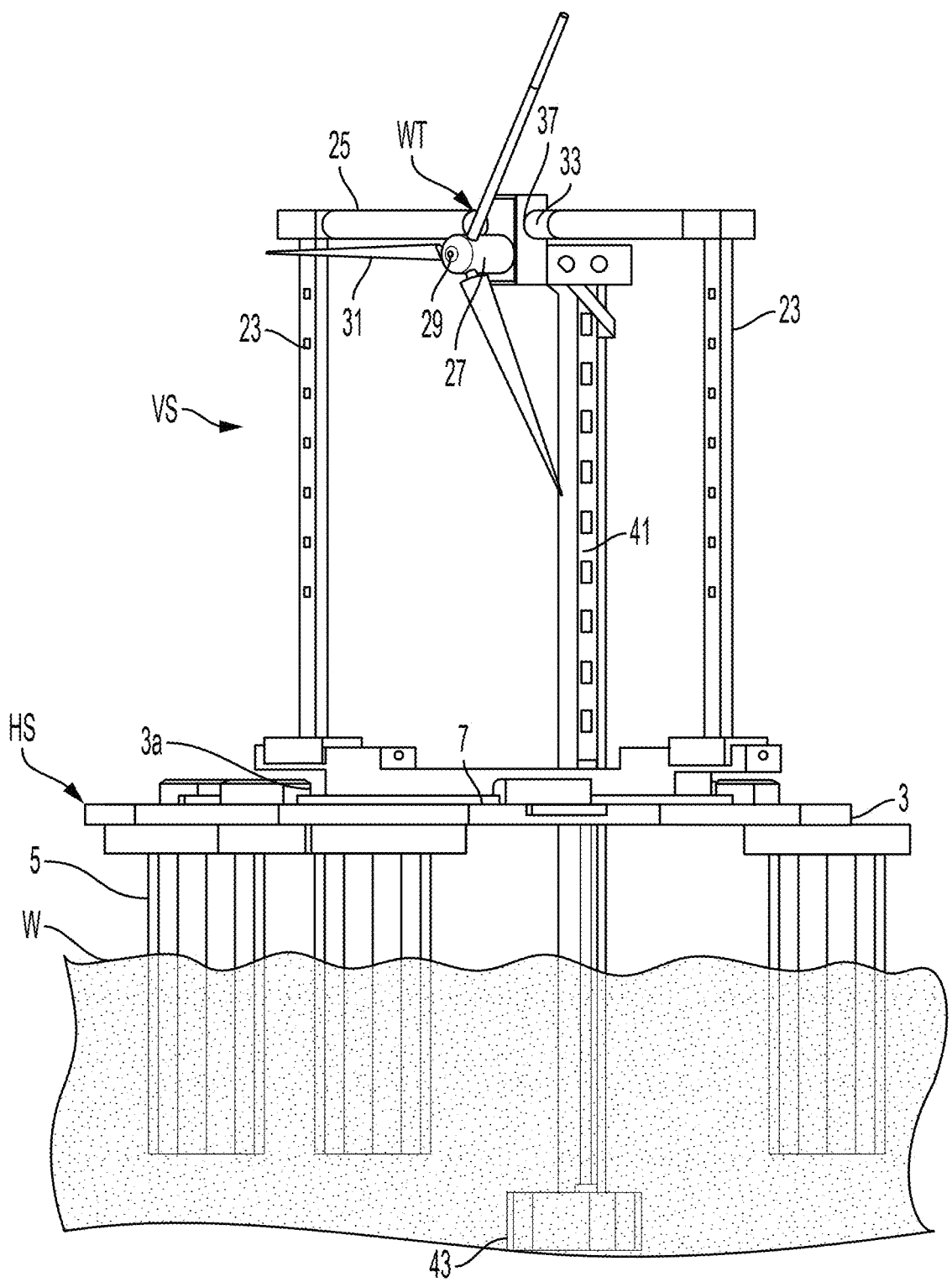
FIG. 8 is a view in right front elevation, corresponding to FIG. 1, of another illustrative embodiment of floating horizontal axis wind turbine in accordance with the present invention, floating in a body of water.

In an embodiment shown in FIG. 8, the vertical element 41 and the weight 43 are extended below the surface of the water. They may be extended to any desired depth; it is desirable that the weight is below the level at which wave action will have substantial effect on the weight. At such levels, the weight will tend to act as an anchor for the entire wind turbine assembly. A weight which is symmetrically streamlined in all horizontal directions is particularly desirable in this embodiment.

The support box 35 could be in different forms, for example a U-shaped stirrup.

The illustrative embodiment has a rectangular slot 45 that accommodates a pitch of +/−8°, corresponding to a wave height of thirty feet (nine meters) for a two-hundred-twenty-foot (sixty-nine meter) floating support. The vertical element 41 will therefore seldom strike the end of the slot. To ameliorate any such collisions, bumpers may be provided on the vertical element 41 or slot ends, or magnetic bumpers may be provided to prevent any contact between the vertical element 41 and the ends of the slot 45. Preferably, movement of the vertical element 41 relative to the ends of the slot is controlled by a applying a back emf to the coils 49 as the end of the slot 45 reaches the vertical element 41, thereby converting the coils 49 and magnets 51 from a linear generator to a linear motor. It will be seen that the coils 49 and magnets 51 permit control of the time required for the vertical 3 element to regain verticality, if such control is desired; such control allows optimizing the output of the linear generator. It is expected that during storms, the yaw correction of the turbine will turn the axis of rotation of the turbine perpendicular to the wind, and the vertical element 41 will be locked in its central position.

Because the wind turbine assembly of the invention operates independently of the type of flotation utilized, only the rotating support structure is shown in FIGS. 3-7. Other rotational support structures may be utilized to maintain proper yaw. Less desirably, conventional yaw control systems may be utilized in some embodiments.

Other wave energy generation systems, such as oscillating water columns, hydroelectric motors, hydraulic turbines, or the like, may generate an electric current using the relative motion of the rotatable support structure and the vertical element caused by waves. Because the wave-energy system (illustratively coils 49 and permanent magnets 51) will produce an electrical output when waves are present, even when wind speeds are below the cutin speed at which the turbine produces electricity, it is desirable to turn the rotatable support 7 into the waves rather than into the wind in these circumstances.

These variations are merely illustrative.

All web sites, publications, patents, and patent applications mentioned herein are hereby incorporated by reference.

In view of the above, it will be seen that the several objects and advantages of the present invention have been achieved, and other advantageous results have been obtained.

The invention claimed is:

1. A wind turbine comprising blades which extend outwardly from and sweep around a horizontal axis of rotation; a nacelle comprising at least a horizontal shaft driven by the blades and a drive train; an upright structure supporting the nacelle and blades, the upright structure extending below the sweep of the blades, and a generally horizontal floating base supporting the upright structure, wherein, the upright structure comprises a pivot supporting the nacelle, and the wind turbine further comprises an elongate vertical element supported by the pivot, the elongate vertical element being connected to the nacelle for movement with the nacelle, the elongate vertical element carrying a weight, the weight maintaining the axis of rotation of the blades in a horizontal position as the floating base pitches, the pivot being located downwind of the blades and upwind of the elongate vertical element.

2. The wind turbine of claim 1 wherein the pivot is above a center of gravity of the nacelle.

3. The wind turbine of claim 1 wherein the upright structure comprises two generally vertical legs spaced behind the blades and a cross-bar connecting upper parts of the two generally vertical legs, the cross-bar carrying the pivot.

4. The wind turbine of claim 1 wherein the pivot is a revolute joint positioned behind the blades and wherein the elongate vertical element is positioned behind the pivot.

5. The wind turbine of claim 1 wherein the elongate vertical element is rigid and wherein the rotatable support comprises restraining walls limiting lateral motion of the elongate vertical element when the rotatable support rolls.

6. The wind turbine of claim 5 further comprising rollers mounted to the elongate vertical element, the rollers engaging the restraining walls when the rotatable support rolls.

7. The wind turbine of claim 1 further comprising at least one magnet attached to one of the elongate vertical element and the rotatable support, and at least one coil attached to the other of the elongate vertical element and the rotatable support, the magnet and coil cooperating to generate an electric current when the rotatable support pitches.

8. The wind turbine of claim 1 wherein the elongate vertical element and the weight are entirely above the surface of water on which the wind turbine is floating.

9. The wind turbine of claim 1 wherein the weight is mounted on a lower portion of the elongate vertical element.

10. The wind turbine of claim 9 wherein the elongate vertical element is rigid and wherein the floating base comprises restraining walls limiting lateral motion of the elongate vertical element when the floating base rolls.

11. The wind turbine of claim 10 further comprising rollers mounted to the elongate vertical element, the rollers engaging the restraining walls when the floating base rolls.

12. The wind turbine of claim 10 wherein the weight extends below the floating base and into water on which the wind turbine is floating.

13. The wind turbine of claim 10 wherein the weight is entirely above the surface of water on which the wind turbine is floating.

14. The wind turbine of claim 10 further comprising at least one magnet attached to one of the elongate vertical element and the rotatable support, and at least one coil attached to the other of the elongate vertical element and the rotatable support, the magnet and coil cooperating to generate an electric current when the rotatable support pitches.

15. A wind turbine comprising blades which extend outwardly from and sweep around a horizontal axis of rotation; a nacelle comprising at least a horizontal shaft driven by the blades and a drive train; an upright structure supporting the nacelle and blades, the upright structure extending below the sweep of the blades, and a generally horizontal floating base supporting the upright structure, wherein, the upright structure is mounted to a rotatable support carried by the base, so that the upright structure, the nacelle, and the blades rotate together about a vertical axis with respect to the base, the upright structure, the nacelle, and the blades have a collective center of gravity that is positioned behind the vertical axis, the upright structure comprises a pivot supporting the nacelle, and the wind turbine further comprises an elongate vertical element connected to the nacelle for movement with the nacelle, the elongate vertical element carrying a weight, the weight maintaining the axis of rotation of the blades in a horizontal position as the floating base pitches.

16. The wind turbine of claim 15 wherein the pivot is above a center of gravity of the nacelle.

17. The wind turbine of claim 15 wherein the upright structure comprises two generally vertical legs spaced behind the blades and a cross-bar connecting upper parts of the two generally vertical legs, the cross-bar carrying the pivot.

18. The wind turbine of claim 15 wherein the pivot is a revolute joint positioned behind the blades and wherein the elongate vertical element is positioned behind the pivot.

19. The wind turbine of claim 15 further comprising at least one magnet attached to one of the elongate vertical element and the rotatable support, and at least one coil attached to the other of the elongate vertical element and the rotatable support, the magnet and coil cooperating to generate an electric current when the rotatable support pitches.

* * * * *